United States Patent [19]

Van Prooijen

[11] Patent Number: 4,555,947

[45] Date of Patent: Dec. 3, 1985

[54] METHOD AND APPARATUS FOR THE MEASUREMENT OF FLUID FLOW VELOCITIES

[75] Inventor: Pieter Van Prooijen, Nieuw-Lekkerland, Netherlands

[73] Assignee: IHC Holland N.V., Papendrecht, Netherlands

[21] Appl. No.: 577,624

[22] PCT Filed: May 19, 1983

[86] PCT No.: PCT/NL83/00020

§ 371 Date: Jan. 17, 1984

§ 102(e) Date: Jan. 17, 1984

[87] PCT Pub. No.: WO83/04106

PCT Pub. Date: Nov. 24, 1983

[30] Foreign Application Priority Data

May 19, 1982 [NL] Netherlands .................... 8202079

[51] Int. Cl.[4] .............................................. G01F 1/70
[52] U.S. Cl. .................................................. 73/861.06
[58] Field of Search ...................................... 73/861.06

[56] References Cited

U.S. PATENT DOCUMENTS 3,762,221 10/1973 Coulthard .................... 73/861.06

4,201,083 5/1980 Kurita et al. .................... 73/861.06

FOREIGN PATENT DOCUMENTS 2551946 4/1977 Fed. Rep. of Germany .
1550300 12/1968 France .

OTHER PUBLICATIONS

Robert C. Waag, et al., "Instrumentation for Noninvasive Cardiac Flow Rate Measurement", *IEEE, Proceedings of the International Symposium on Sonics and Ultrasonics,* Boston, Mass., Oct. 4–7, 1972, pp. 74–77.

F. J. Thomson, "Broadband Pulsed Doppler Ultrasonic System for the Noninvasive Measurement of Blood Velocity in Large Vessels", *Medical & Biological Engineering and Computing,* vol. 16, No. 2, Mar. 1978, pp. 135–146.

Primary Examiner—Herbert Goldstein
Attorney, Agent, or Firm—Young & Thompson

[57] ABSTRACT

Method and apparatus for the measurement of fluid flow velocities for instance in a slurry transport conduit, in which pulse signals are sent through the fluid by pairs of transmitting and receiving transducers, the pulses having such time separation that standing waves caused by reflection fade out within the time separation, and using side band techniques and correlation techniques.

16 Claims, 4 Drawing Figures

METHOD AND APPARATUS FOR THE MEASUREMENT OF FLUID FLOW VELOCITIES

The present invention relates to a method and an apparatus for the measurement of fluid flow velocities, for instance in a slurry transport (mixture liquid/solid material) or in a pneumatic transport (dry gas/solid material), but also for the measurement of the velocity of a liquid or gas and mixtures thereof.

In a known device, disclosed in the British Patent Specification No. 1,359,151 at least two transmitter transducers, situated at a predetermined mutual distance seen in the flow direction of the fluid, transmit signals through said fluid to at least two receiver transducers, also situated at a predetermined mutual distance seen in the flow direction of the fluid, in which each receiver transducer receives mainly the signal from the associated transmitting transducer and in which the signals supplied by the receiver transducers are correlated, in order to determine the fluid flow velocity.

In a slurry-transport in dredger conduits irregularities occur continuously in the flowing fluid, such as vortexes in the water carrying the sand and sludge or other material. Moreover this carried material will not be divided evenly, but will appear as clouds, which continuously chang in composition and shape.

The signals transmitted by the transmitter transducer through this mixture are modulated continuously by said irregularities between the transmitter transducers and receiver transducers and these irregularities can be used after demodulating the received signal by means of cross correlation methods for the measurement of the travel velocity of the mixture. In case the distance in the flowing direction of the mixture between the transducers is sufficiently small, said irregularities will have changed to a very small extent only, so that by comparing the demodulated signals from the two receiver transducers by the said cross correlation method, it is possible to determine the time which the mixture needs to travel between the pairs of transducers, from which the fluid flow velocity can then be calculated.

In the method known from above said British Patent Specification use is made of a continuous signal transmitted by the transmitter transducer, from which signal is separated the amplitude modulation by detection, which modulation is then used for correlation.

After thorough research it appeared, that such continuous signal often results in an interference pattern of standing waves in the dredger conduits. In particular in the case of small conduit diameters and low specific mass such interference patterns can be very detrimental for the correlation measurement. Because this interference pattern is determined also by the mixture and need not be the same for the pair of transducers (transmitter/receiver) this phenomenon has not been recognized as an unwanted interference.

Therefore one of the main objects of the present invention is to remove the results of the received signals from the interference patterns of standing waves.

According to the present invention the above object is reached by transmitting pulse-shaped signals by the transmitter transducers having such mutual time separation, that within this time separation standing waves caused by reflections will nearly completely fade out.

In order also to exclude from the velocity measurement interference patterns generated by pulse-shaped signals of too long duration, preferably samples are measured only of the signal received by the receiver transducer as soon as possible after reception by the receiver transducer of the front edge of the transmitter signal.

In connection with the desired equivalence of the two signal processing channels, each comprising a transmitter transducer and a receiver transducer, preferably use is made of the same frequency for these two channels. In order to avoid cross talk between the signal processing channels the pulse-shaped signals are transmitted according to the present invention by the one transmitter transducer within a time separation between the pulse-shaped signals of the other transmitter transducer, in which the time separation between pulses of different transmitter transducers has been chosen such, that within this time separation standing waves caused by reflections will fade out nearly completely.

In order to avoid loss of information upon using pulse-shaped signals, the pulse repetition rate will be at least two or three times as high as the highest frequency which after demodulation of the received signal supplies information as to the velocity of the fluid.

Other signals which may be detrimental for the measurement are caused by collisions of for instance sand grains against the transducers and against the walls of the fluid conduits. These signals form a nearly continuous noise spectrum, extending from a very low frequency to very high frequencies, containing the operation range of frequencies used in the present invention, which means the range at both sides of the frequency signal transmitted by the transmitter transducer, which can be regarded as a carrier wave and hence also the side bands of the modulation signals at both sides of this carrier frequency signal.

This broad band noise will change continuously from location to location and will not appear in the form of a pattern carried by the current, such as the above said vortexes, so that this noise cannot be used for signals to be correlated.

As far as there is anything to be correlated in this broad band noise, this signal mainly will carry information concerning the water layers passing directly in front of the receiver transducers and not across the total cross section of the conduit, because of the increasing attenuation, depending on the distance before the head of the receiver transducer. The amplitude of this noise yet may be strong enough, so that in a broad range on both sides of said carrier signals side bands will occur, which may conceal the useful signals. This broad band noise is present all the time and independent of the transmitted send signal.

The interference caused by this broad band noise can be reduced considerably by sampling the received signal immediately before and immediately after the front edge of the transmitted pulseshaped signal reaches the receiver transducer and by using a sufficiently small distance between these samples.

As remarked above in the method known from said British Patent use is made of the amplitude modulation of the signal transmitted by the transmitter transducer brought about by the physical phenomena in the moving fluid, which signal as far as the receiver transducer is concerned can be seen as a carrier wave.

It appeared that this amplitude modulation forms only a part of the total influence exerted on the carrier wave by the fluid.

When an acoustic wave is transmitted across a slurry stream, the acoustic results thereof will be the following:

(1) water vortexes will exert upon the acoustic velocity of the crossing acoustic wave an accelerating or delaying influence. By Doppler-phenomena increase and decrease of frequencies will result, which means side bands above and below the transmitted carrier wave frequency.

(2) Sand clouds and/or slurry clouds possibly carried along will inter alia cause a more or less strong attenuation of the crossing ultrasonic audio wave, which means also that additional side bands will be added.

The vortexes and sand clouds or slurry clouds are carried on by the water stream and will change only little over a sufficiently small distance between the pairs of transducers and therefore will be sufficiently useful as sources for signals to be correlated for velocity measurement.

The frequencies of the side bands caused by the vortexes mainly are dependent on the velocity of the pumped mixture, the pipe cross section and the dimensions (cross section) of the receiving transducers. Theoretically all frequencies will occur from zero to infinite. The reasonably workable signals are provided, however, by the smallest vortexes which can be ascertained. These vortexes will have a diameter which is as large as the cross section of the receiver transducers, which means a few centimeters. This means that alternately an accelerating and a delaying crossing path for the acoustic wave will occur having a thickness equal to the cross section of the receiver transducer. When this pattern passes with the highest velocity to be measured, which means practically 10 meters per second, this will result in a maximum processing frequency, which also can be termed the deviation frequency such as in FM techniques. This deviation frequency can be computed as follows:

$$f_h = \frac{V_m}{2d_t}$$

Herein is $f_h$ = maximum frequency in Hz
$V_m$ = maximum flow velocity (10 m per second)
$d_t$ = diameter of the receiver transducer (3 cm)

From the above formula it appears, that upon using the said values for the velocity and diameter the maximum frequency to be measured will be about 160 Hz. Using this frequency the carrier wave can be shifted to an upper side band and to a lower side band with respect to the frequency position of the carrier wave transmitted by the transmitter transducer. This mechanism can be compared also with a tape recorder, in which the highest frequency depends on the head slit and the tape velocity.

The frequency distance of these side bands up to the position of the carrier wave frequency depends on the velocity component of the vortexes in the direction of propagation of the audio signal, which means perpendicular to the flow direction.

The most extreme situation will occur in case the vortex components in the direction of the audio ray are equal to the velocity in the conduit and in the same diection or in the opposite direction. This will result in that the audio velocity V of the crossing wave in case of a flow velocity of 10 m per second will vary from 1500+10 to 1500−10 m per second (the audio velocity in water being estimated as 1500 m per second).

In case the length of the crossing path is 1 and the transmitted frequency f within this path, there will be $1/v \times f$ waves varying in number 20/1500. This variation may occur in 1/400 second.

Approximately this is the time duration of half a period of $f_h$. This means that in the case of a conduit diameter of 150 mm and a carrier wave having a frequency of 0.25 MHz there will be a deviation of $400 \times 20/1500 \times 1/v \times f$ = about 130 Hz.

This is an extreme situation which does not occur continuously, but this gives an idea of what might occur. Despite the fact that the vortexes influence the received frequency this should not be seen as frequency modulation in the usual sense of this term. In the mechanism which is working here, in principle there is no relation between the upper side band and the lower side band. Considerable differences may occur between these side bands, because the vortexes almost never will be purely symmetrical. The side bands are generated mutually independent and preferably should be reproduced and processed separately in the receiver.

The variable attenuation of the crossing ultrasonic audio wave by the sand clouds and slurry clouds will result in a sort of amplitude modulation. Because moreover by the presence of sand and slurry the physical characteristic of the fluid will change, thus also will change the propagation velocity of the audio and this also will result in a particular pattern of side bands having no symmetrical character. This can be regarded as a sort of frequency modulation.

Because the pattern of side bands for said reason will not be symmetrical preferably a single side band technique will be used.

The presence of all above information carrying signals is positively tied to the presence of a transmitted carrier wave, because the influence upon this carrier wave will result in the generation of said side bands. In contradistinction the broad band noise mentioned before will be present always and will be independent of a transmitted transmitter signal.

Therefore, in a further preferred method for the measurement of the fluid velocity, the upper side bands and/or lower side bands will be separated from the signals received by the receiver transducer with respect to the carrier wave transmited by the transmiter transducer and for the correlation use will be made of pairs of two thus-formed upper side bands and/or lower side bands.

Figure 1:
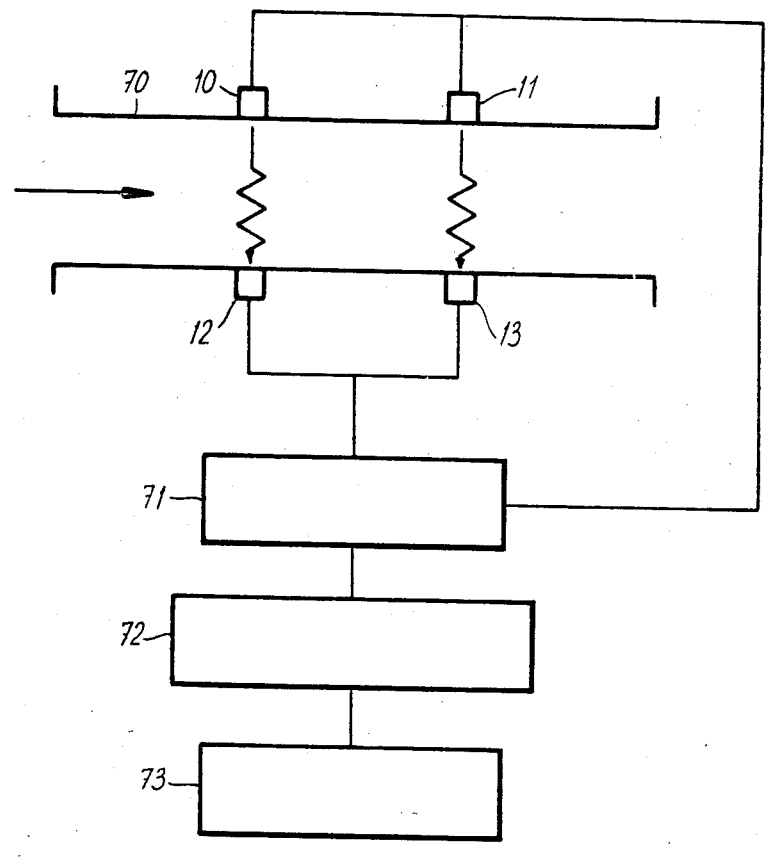
FIG. 1 is an overall diagram of the present invention.

In principle a device for the measurement of the flow velocity of a fluid will consist of four parts shown in FIG. 1:

(1) the take up part, consisting of a transport conduit 70 having diametrically place transmitting and receiving transducers 10, 11 and 12, 13 respectively, transforming electrical signals into ultrasonic audio vibrations and then into electrical signals again.

(2) the pre-processor 71, supplying the electrical signals to the transmitting transducer 10 and 11 and processing the electrical signals received by the receiver transducers 12 and 13 in such a way that signals to be correlated are generated.

(3) the cross correlator 72, performing the measurement between the correlatable signals supplied by the pre-processor 71.

(4) a display device 73, displaying in an analogue or digital way the ascertained velocity.

The pre-processor 71 shoudl fulfill a number of conditions in order to perform the method of the present invention.

In order to exclude the standing wave patterns pulse-shaped signals should be used in the conduits. After each signal pulse reflections should fade out before the following signal pulse is transmitted. Because of the necessary equality of the signal processing channels these preferably work at the same frequency. In order to avoid cross talk the pulses should be transmitted alternately by the transmitter transducer. The measurements then will be a sampling process of the results obtained per pulse-shaped signal. In order not to avoid loss of information the repetition rate should at least be twice or three times as high as the highest frequency which may occur as useful information.

Moreover, the information containing signals should be separated as much as possible from the broad band noise signals generated in the transport conduit itself. Because as above said, there is no relation between the upper side bands and the lower side bands the receiver system should be designed as a true single side band receiver. Using the above values for the conduit diameter, transducer diameter and flow velocity, the low frequency band width should extend between 2 and 150 Hz.

Because the pre-processor is followed by the cross correlator 72, which is adapted to ascertain all repeating phenomena, all dependent phenomea should be defined completely, so that no jamming time functions will reach the correlator. In accordance with the above criteria the pre-processor according to the invention will have to satisfy the following requirements:

The signal transmitted by the transmitter transducer in the first instance is generated by a generator having a frequency which is four times as high as the frequency of the signal transmitted by the transducers. This alternating voltage of about 1 MHz is divided by four by means of two D-flipflops. The following voltages will be obtained by a suitable combination of the signals generated thereby:

(1) a staircase voltage of the desired frequency, adapted to control the transmitter output stage through a simple low pass filter;

(2) two block voltages having a mutual phase shift of 90°, which can be used as reference control signal for the multiplying stages in the receiver.

The device known from above said British Pat. No. 1,359,151, comprises generally at least two transmitter transducers, located behind one another in the flow direction of the fluid, two receiver transducers, also located behind one another in the flow direction of the fluid, each mainly intended for receiving signals transmitted by an associated transmitter transducer and influenced by the medium, and correlation means connected with the receiver transducer, in order to derive the fluid flow velocity from the time difference between the signals supplied by the receiver transducer.

The device of the present invention is characterized by means for separating an upper side band and/or a lower side band from signals supplied by each transmitter transducer with respect to the signals transmitted as a carrier wave by the transmitter transducer in the fluid and means for supplying to the correlation means the two thus-separated upper side bands and/or lower side bands, in order to determine the fluid velocity from their time difference.

Preferably the above device comprises means for supplying to the transmitter transducer pulse-shaped signals having such mutual time separation, that between the pulses all standing waves caused by reflections will die down.

Moreover, the means for transmitting the pulse-shaped signals are designed such, that the transmitter transducer will transmit a pulse-shaped signal alternately.

Preferably the device of the present invention comprises:

pulse generator means for supplying to two separate gate pulse conductors, one for each signal processing channel, gating pulses, the duration of which corresponds with that of the pulse-shaped signals transmitted by the transmitter transducers, which pulses are supplied alternately to gate pulse conductors of each signal processing channel;

oscillator means for generating two carrier wave signals having equal frequency but a phase difference of 90°, in which a separate one of these two carrier wave signals is supplied to each signal processing channel;

first gate means in each signal processing channel, comprising two inputs, one of which is connected with the gate pulse conductor for receiving the gate pulses, the other input being connected with the oscillator means for receiving the carrier wave signals, the output signal consisting of a carrier wave signal pulse train, supplied to the transmitter transducer in the signal processing channel;

two product detectors in each signal processing channel, each first input of which receives signals supplied by the receiver transducer, each second input of which receives the carrier wave signal, however, with a phase shift of 90° between the signals for each second input of these two product detectors;

90° phase shift means connected with the output of each of the product detectors;

signal adding means, supplying the sum signal of the output signal from a product detector and the 90° shifted output signal of the other product detector, which sum signal corresponds with one side band of the signal demodulated by the product detectors;

signal subtracting means, supplying the difference signal of the output signal from a product detector and the 90° shifted output signal from the other product detector, which difference signal corresponds with the other side band of the signal demodulated by the product detectors;

first delay means in each signal processing channel, the input of which receives gate pulses, the output supplying a first sample control signal having such a time delay, that the first sample control signal will appear immediately before the reception by the receiving transducer of the front edge of the pulse-shaped carrier wave signal;

second delay means in each channel, the input of which receives the gate signals, the output supplying a second sample control signal having such a second time delay, that the second sample control signal will appear immediately after the reception by the receiver transducer of the front edge of the pulse-shaped carrier wave signal;

four sample hold means in each signal processing channel, one pair of which receives the output signal of the first product detector and the other pair of which receives the output signal of the second product detector, one of the sample hold means of each pair also receiving the first sample control signal and the other of the sample hold means of each pair also receiving the second sample control signal;

subtracting means for each pair of sample hold means, supplying the difference between the output signals of the pairs of sample hold means, which difference contains nearly exclusively information concerning the modulation of the carrier wave signal in the fluid;

third delay means in each signal processing channel, the input of which receives gate signals, the output supplying a third sample control signal, having such a third time delay, that this third sample control signal appears after the front edge of the difference output signal supplied by the subtraction means;

two further sample hold means in each signal processing channel, one input of which receives the third sample control signal, the other input of each of the sample hold means being connected with one of the subtracting means, such that the sample hold means exclusively supply a signal corresponding with the pure difference signal of each of both subtraction means.

The output of each product detector is connected to a low pass filter having such a rise time, that this filter can readily follow the information contents of the product detector output signal and in which each third sample hold circuit is connected with a band filter, passing exclusively signals containing information concerning the modulation imparted to the carrier wave signal by the medium.

The invention will now be further elucidated by means of the drawings, showing embodiments of a device according to the present invention.

In the receiver, receiving the signals from the receiver transducers, preferably use is made of multiplying synchronous detectors or product detectors, supplying as output signal the product of the input signals, which are the signals of the differential frequency of beat frequency and with instantaneous amplitude, depending on the instantaneous phase difference between both these input signals. These product detectors are followed by low pass filters, having a maximum pass frequency of about 3500 Hz, said filters also having a rise time of about 100 micro seconds.

The dimensions of the receiver transducers limit, as explained above, the signals relating to the mixture velocity to the said processible frequencies of about 160 Hz. This means, that the information contents of a particular kind within the rise time of this low pass filter and having a maximum frequency of 3500 Hz cannot or hardly change. It is especially to be noted, that the above said values, such as dimensions, numbers, frequencies, and times relate to an example tested in practice, the satisfactory operation of which has been proved in a dredger conduit having a cross section of 150 mm.

Figure 2:
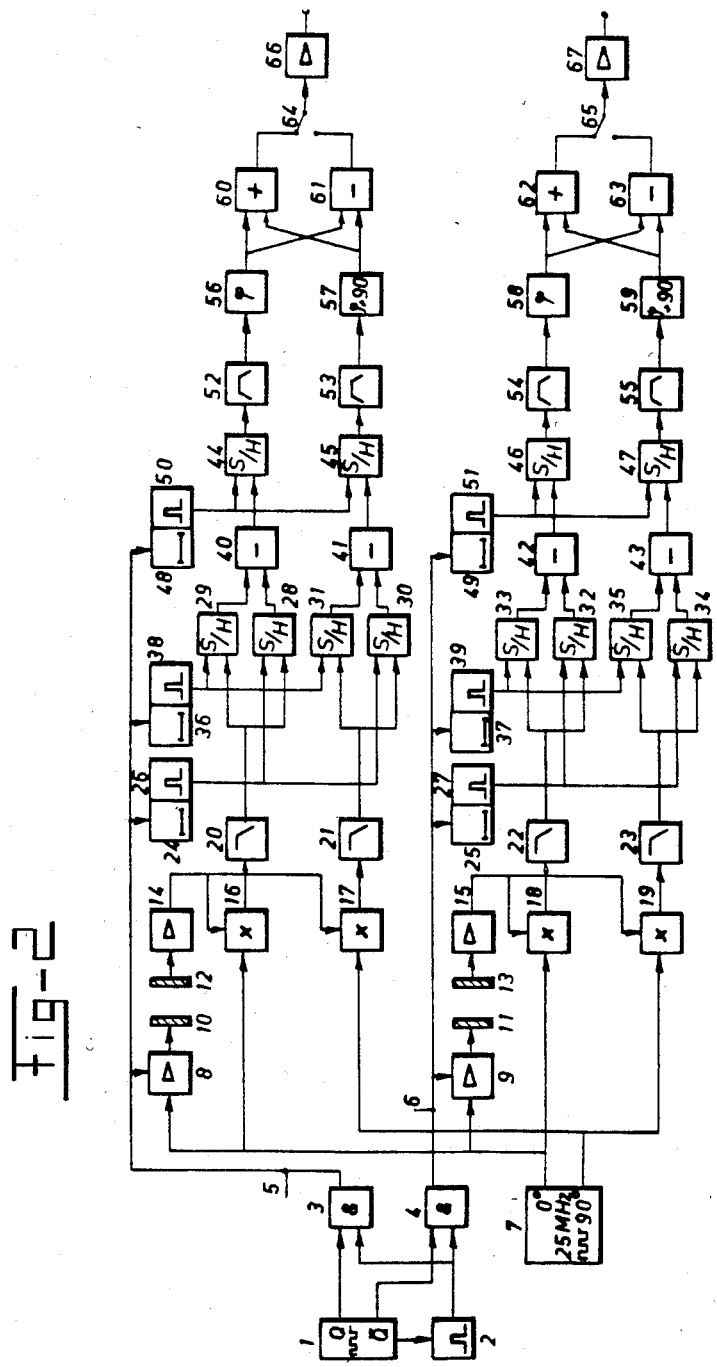
FIG. 2 shows a schematic block diagram of a device of the present invention, with the exception of the correlation device and the delay device.
Figure 3:
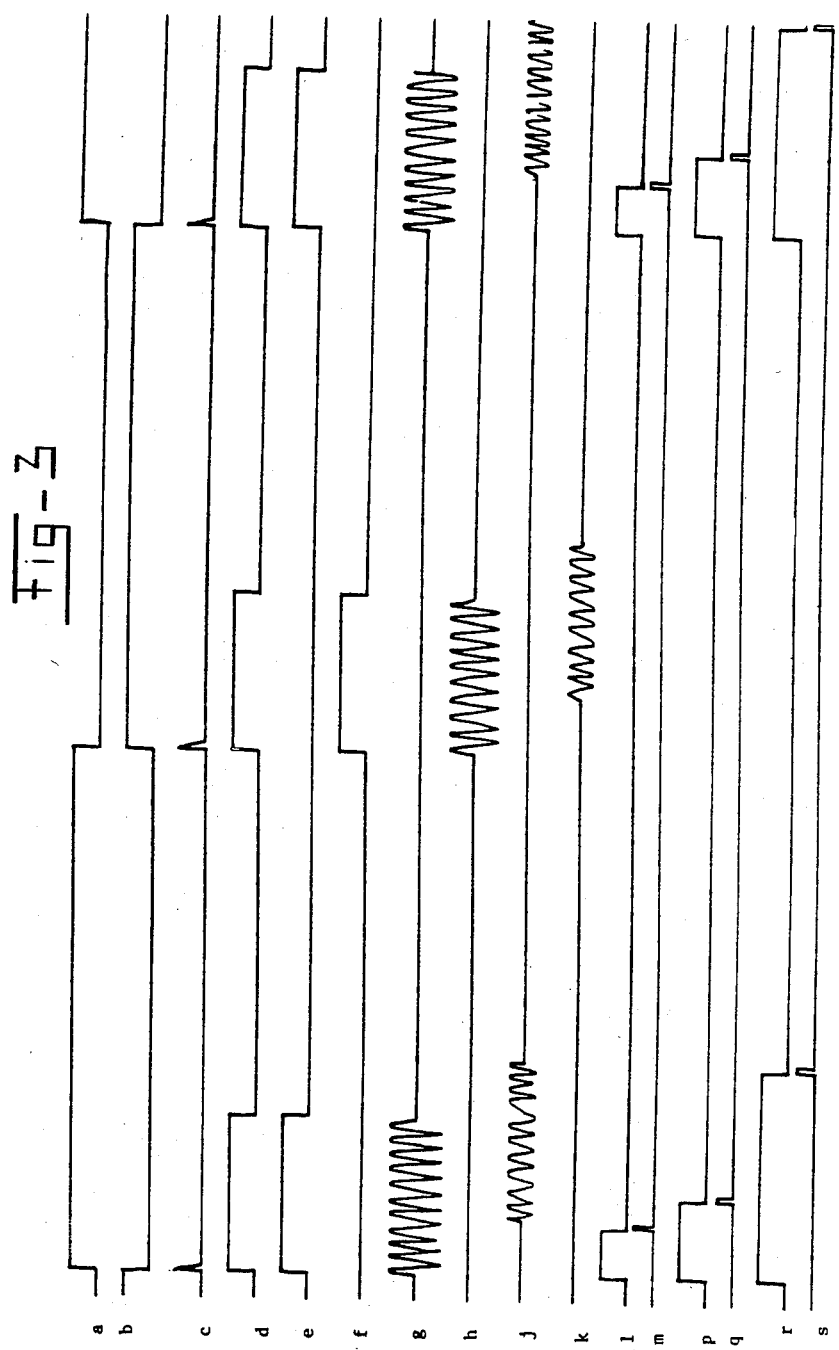
FIG. 3 shows in a time diagram signals appearing in different points of the circuit of FIG. 2. The horizontal axis forms a time scale, in which 1 cm corresponds with about 100 μsec.

The block generator 1 in FIG. 2 generates symmetrical, staircased signals in counterphase, having a frequency of 500 Hz, in FIG. 3 shown on lines a and b. At each turnover or step of these signals, a trigger signal is sent to the monostable circuit 2, vide FIG. 3, line c, which monostable oscillator 2 as a result supplies a pulse having a length of about 300 micro seconds, vide line d in FIG. 3. This pulse is combined in the "AND"-gates 3 and 4 with signals from oscillator 1, Gates 3 and 4 supply as a result alternately a signal of 300 micro seconds via the gate pulse lines 5 and 6 to both signal processing channels, vide FIG. 3, lines e and f.

The high frequency oscillator 7 generates an alternating voltage of about 1 MHz, which after division by four results in a frequency of 250 KHz, supplied in both outputs, however, having a mutual phase difference of 90°. These two signals are fed respectively to the inputs of the transmitter output amplifiers, 8 and 9 respectively.

The pulses on lines 5 and 6 (e, f) will open the transmitter output amplifiers 8 and 9 for about 300 milli seconds, within which the amplified signals from oscillator 7 are supplied to the transmitter transducers 10 and 11.

Given a pipe diameter of 150 mm and an acoustic velocity in water of 1500 m per second, the crossing time for an acoustic wave will be 100 micro seconds. To that should be added the travel time of the signal through the transducers, which for each transducer is about 5 micro seconds. The total time between the electrical transmission and the electrical reception is therefore 110 micro seconds.

The wave trains shown on lines g and h in FIG. 3, transmitted by the transmitter transducers 10 and 11, reach the receiving pre-amplifiers 14 and 15 respectively, vide FIG. 3, lines j and k, after a delay of 110 micro seconds through the receiver transducers 12 and 13.

The amplified received signals from the pre-amplifiers 14 and 15 are supplied to the product detectors 16, 17 and 18, 19 respectively, each followed by its own loss pass filter 20, 21 and 22, 23 respectively, having a cut off frequency of about 3500 Hz, as said above, corresponding with a rise time of about 100 micro seconds. Explained in a more simple way this means, that this filter at each moment will deliver a signal voltage, which is the average of what has been received within the preceding 100 micro seconds.

As remarked above after each receiver pre-amplifier 14 and 15 two parallel product detectors 16, 17 and 18, 19 are used, receiving the signals mutually phase-shifted 90°, having a frequency of 250 KHz. Then follow two parallel branches in which these signals having a mutual 90° phase shift remain intact. This is done to obtain separate upper side bands and lower side bands, as will be explained later on.

The signals in the gate pulse lines 5 and 6, shown on lines e and f of FIG. 3, are supplied to delay circuits 24, 25. These consist of monostable multivibrators, triggered by the front edge of signals e, f and returning after a delay time of 95 micro seconds, supplying in turn a trigger signal to the monostable multivibrators 26 and 28 respectively, each generating a pulse of 6 micro seconds. These pulses are supplied to sample hold circuits 28, 30 and 32, 34 respectively. During this pulse time of 6 micro seconds the opened sample hold circuits sample the signals supplied by filters 20, 21 and 22, 23 respectively. The valve thus obtained remains present and constant in the output of each sample hold circuit until replacement by the next sample.

The delay time of 95 micro seconds has been chosen such, that the trigger pulse on line m appears just before the reception of the front edge of the received signals, vide lines j, k in FIG. 3, in the product detector 16, 17 and 18, 19 respectively. The signal thus obtained in the sample hold circuits therefore contains information relating only to the broad band noise, hence without the side bands resulting from modulation of the carrier wave in the fluid.

The signals e and f in lines 5 and 6 are supplied next to delay circuits 36 and 37, each followed by a multivibrator 38, 39. The delay circuits 36 and 37 will be triggered by signals e and f and generate a pulse having a length of 250 micro seconds. At the moment of appearance of the trailing edge of this pulse, vide line p, the monostable circuits 38 and 39 are triggered, each supplying again a pulse having a duration of 6 micro seconds. As shown in FIG. 3 these last pulses appear on line q after the front edge of the signal received by the product detectors, vide line j.

110 Micro seconds after the front edge of the transmitted pulse, line g, the desired side band information will arrive in the filters 20, 21 and 22, 23 respectively mixed with broad band background noise. In order to obtain the desired information at the output of said last mentioned filters there must be a delay of at least the rise time of these filters, which means at least 100 micro seconds. This has been taken into account upon selecting the length of the delay time of the delay circuits 36 and 37 of 250 micro seconds, vide line p.

The output signals of filters 20, 21 and 22, 23 respectively are supplied to sample hold circuits 29, 31 and 33, 35 respectively, which then from that moment will supply a signal consisting of broad band noise plus the desired side band information. These signals are supplied to the differential amplifiers 40, 41 and 42, 43 respectively, supplying the difference between the output signals of the sample hold circuits 28, 30, 32, 34 on the one hand and 29, 31, 33, 35 on the other hand. The differential signals of these differential amplifiers contain after a transient time information concerning substantially only the desired side bands. The broad band noise signals are cancelled out here.

The output signals of these differential amplifiers are supplied again to further sample hold circuits 44, 45 and 46, 47 respectively. These sample hold circuits are controlled again by trigger signals from the multivibrators 50 and 51 having a length of 6 micro seconds, which each are controlled in turn by delay cicuits 48, 49, each having a delay of 400 micro seconds. This time delay is of sufficient length that the differential amplifiers have reached a stable condition after the last transient signals. Hence the sample hold circuits 44, 45 and 46, 47 respectively supply pure signals containing information of the side bands, each from an upper side band as well as from a lower side band.

The output signals from the sample hold circuit 44, 45 and 46, 47 respectively are supplied to band pass filters 52, 53 and 54, 55 respectively, having a pass band of 2–150 Hz.

These filters are followed by circuit parts 56–67, separating and amplifying the upper side bands and lower side bands, such that the amplifier outputs 66 and 67 supply four signals having different information contents, which can be supplied to the cross correlation circuits. Hereafter the operation of these separating circuits will be elucidated further, vide FIG. 4, in which the same reference numbers are used for corresponding parts as in FIG. 2. In order not to overload this FIG. 4 it shows the necessary parts only.

Figure 4:
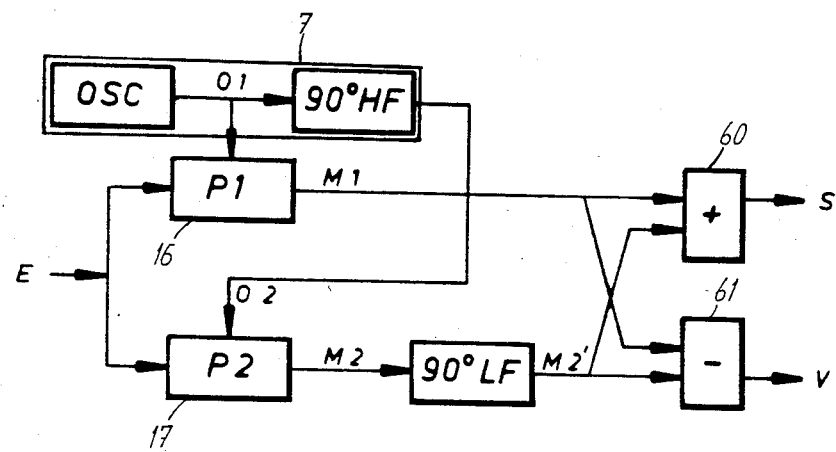
FIG. 4 shows a schematic block diagram of the circuit for separating the side bands.

In FIG. 4 reference number 7 refers to oscillator 7 in FIG. 2, generating two signals having a frequency of 250 kHz, mutually phase-shifted over 90°. These two, 90° phase-shifted signals are supplied again to mixer circuit 16, 17. The output signals from these mixer circuits reach, after passing different blocks, the outputs of the filters 52 and 53, not shown here. In the intermediate blocks these signals are sampled only, but this is not of importance for the operation of the said band separation.

In addition to the useful signal, mixer circuit 16 also receives the signal from the oscillator 7 without 90° phase-shift, whereas the mixer stage 17 receives the signal with a 90° phase-shift.

The mixer stage 17 is followed in the circuit of FIG. 4 by a phase-shift circuit imparting an additional phase-shift of 90° to the output signal of the second mixer stage 17. The signals thus obtained are supplied next to the adding circuit 60 and to the subtracting circuit 61 respectively. The adding circuit supplies a signal s, the subtracting circuit the signal v.

This circuit operates as follows:

First an upper side band will be considered, which means a received signal of frequencies which are a little higher than the carrier wave or the reference, followed by a lower side band having frequencies which are a little lower than this carrier wave or reference.

(A) Reception of the upper side band

The oscillator 7 supplies the reference signal
$01 = \cos \alpha$
$02 = \cos (\alpha + 90)$
Reception of signal E, a little higher in frequency than the oscillator, hence:
$E = \cos (\alpha + \delta)$
The first mixer stage 16 supplies:

$$M1 = E \times 01 = \cos (\alpha + \delta) \times \cos \alpha$$
$$= 0.5 \cos (2\alpha + \delta) + 0.5 \cos$$

and because of the low pass filter 20:
$M1 = 0.5 \cos \delta$
The second mixer stage 17 supplies:

$$M2 = E \times 02 = \cos (\alpha + \delta) \times \cos (\alpha + 90)$$
$$= 0.5 \cos (2\alpha + 90 + \delta) + 0.5 \cos (\delta - 90)$$

and because of filter 21:
$M2 = 0.5 \cos (\delta - 90)$
M2 will have a 90° additional phase shift, hence:
$M2' = 0.5 \cos \delta$
$S = M1 + M2' = \cos \delta$, hence the single upper side band
$V = M1 - M2' = 0$, hence no output, from the upper side band (B) Reception of lower side band The oscillator 7 supplies the reference signal:
$01 = \cos \alpha$
$02 = \cos (\alpha + 90)$
Now is received signal E, which is a little lower in frequency than the oscillator, hence:
$E = \cos (\alpha - \gamma)$
The first mixer stage 16 supplies:

$$M1 = E \times 01 = \cos (\alpha - \gamma) \times \cos \alpha$$
$$= 0.5 \cos (2\alpha - \gamma) + 0.5 \cos$$

and because of the low pass filter 20:
M1=0.5 cos γ
The second mixer stage 17 supplies:

$$M2 = E \times O2 = \cos(\alpha - \gamma) \times \cos(\alpha + 90)$$
$$= 0.5 \cos(2\alpha + 90 - \gamma) + 0.5 \cos(\gamma + 90)$$

and because of filter 21:
M2=0.5 cos (γ+90)
M2 will have a 90° additional phase shift, hence:
M2'=0.5 cos (γ+180)=+0.5 cos γ
Hence:
S=M1+M2'=0 and
V=M1−M2'=cos γ

The above shows that the lower side band will result in a signal only in the output V and not in S. Thus this circuit offers the possibility of separate reception of upper side band and lower side band in the outputs S and V respectively.

A phase shift of 90° over the desired band of 2-150 Hz cannot be realized physically by means of a filter. Instead two filters can be used, giving a mutual difference in phase shift of 90° over a large frequency range.

The filters 52 and 54 are followed therefore by the broad band phase shift filters 56, 58 respectively, whereas the filters 53 and 55 are followed by filters 57 and 59 respectively, giving an additional 90° phase shift. The signals from the filters 56 and 57 supply, adding in the added circuit 60 the upper side band and subtracting in the subtracting circuit 61 the lower side band. The same applies to the other reception channel. The adding circuit 62 supplies the upper side band the subtracting circuit 63 the lower side band.

The upper side bands and/or lower side bands can be selected by means of switches 64 and 65 in order to be applied by means of amplifiers 66 and 67 to a cross correlator 72 in FIG. 1 for further porcessing and displaying the fluid velocity by means of the display circuit 73.

By using the upper side bands and lower side bands separately and two signal processing channels, each comprising a transmitter transducer and a receiver transducer, the same effect can be obtained as with four signal processing channels without using side band separation techniques.

By using the above discussed circuit a high reliability and accuracy of the velocity measurement can be obtained, which experimentally appears to be within 2%. The background noise is suppressed very strongly and errors resulting from standing waves are nearly completely absent.

I claim:

1. In a method for the measurement of fluid flow velocities, in which at least two transmitter transducers, situated at a predetermined mutual distance seen in the flow direction of the fluid, transmit to at least two receiver transducers, also situated at a predetermined mutual distance seen in the flow direction of the fluid, in which each receiver transducer receives mainly the signal from an associated transmitting transducer and in which the signals supplied by the receiver transducers are correlated, in order to determine the fluid flow velocity; the improvement comprising transmitting from the transmitter transducers pulse-shaped signals having such mutual time separation, that reflections caused by standing waves nearly completely fade out within this time separation.

2. Method as claimed in claim 1, in which the pulse-shaped signals are transmitted by the one transmitter transducer within a time separation between the pulse-shaped signals of the other transmitter transducer, the time separation between pulses of different transmitter transducers being such, that within this time separation standing waves caused by reflections fade out nearly completely.

3. Method as claimed in claims 1, in which during each pulse a signal train is transmitted having equal frequencies for all pulses of both transmitter transducers.

4. Method as claimed in claim 1, and first sampling the signals received from the receiver transducer immediately before reception of the pulse signals transmitted from the transmitter transducer by the receiver transducer, whcih first sample contains information concerning only the signals generated in the fluid itself, deriving a sample signal from this first sampling, which signal is stored in a hold circuit, secondly sampling the signals received by the receiver transducer after reception of the signals generated by the transmitter transducer, which signals apart from information generated within the fluid also contain information of the signal generated by the transmitter transducer and influenced by the medium, deriving from this second sampling a second sample signal, which is stored in a hold circuit and subtracting the thus obtained two sample signals from one another, so that only the useful signal remains, containing information concerning the signal received from the transmitter transducer and influenced by the fluid.

5. Method as claimed in claim 4, in which the first and second samplings succeed each other so fast, that nearly no change of the broad band noise signal occurs within this short time.

6. Method as claimed in claim 1, in which upper side bands and/or lower side bands are derived from the signals supplied by the receiver transducers with respect to the carrier wave signals transmitted by the transmitter transducer and two such obtained upper side bands and/or lower side bands are used for the correlation process.

7. Method as claimed in claim 6, in which for each channel the upper side band as well as the lower side band are separated, each channel being formed by one transmitter transducer and one associated receiver transducer and in which the upper side bands of the signal processing channels and the lower side bands of the signal processing channels respectively are correlated.

8. In a device for the measurement of fluid flow velocity, comprising at least two transmitter transducers, situated behind one another in the medium flow direction, two receiver transducers, also situated behind one another in the fluid flow direction, each receiver transducer receiving from an associated transmitter transducer, and correlation means connected with the receiver transducers, in order to derive the fluid flow velocity from the time difference between the signals supplied by the receiver transducers; the improvement comprising means for supplying to the transmitter transducers pulse-shaped signals having such mutual time separation, that within this time separation all standing waves caused by reflections will fade out.

9. Device as claimed in claim 8, and means for separating an upper side band and/or a lower side band from the signals received by each receiver transducer, with respect to the signals transmitted as carrier wave by the transmitter transducer in the fluid, and means for applying two thus-separated upper side bands and/or lower side bands to the correlation means, in order to determine the fluid velocity from their time differences.

10. Device as claimed in claim 9, and means for alternatively transmitting pulse-shaped signals by the two transmitter transducers.

11. Device as claimed in claim 9, comprising two signal processing channels, each having one transmitter transducer and one receiver transducer, and:

pulse generator means for supplying to two separate gate pulse conductors, one for each signal processing channel, gating pulses the duration of which corresponds with the pulse-shaped signals transmitted by the transmitter transducers, which pulses are supplied alternately to gate pulse conductors of each signal processing channel;

oscillator means for generating two carrier wave signals having equal frequency but a phase difference of 90°, in which a separate one of these two carrier wave signals is supplied to each signal processing channel;

first gate means in each signal processing channel, comprising two inputs, one of which is connected with the gate pulse conductor for receiving the gate pulses, the other input being connected with the oscillator means for receiving the carrier wave signals, the output signal consisting of a carrier wave signal pulse train, supplied to the transmitter transducer in the signal processing channel;

two product detectors in each signal processing channel, each first input of which receives signals supplied by the receiver transducer, each second input of which receives the carrier wave signal, however, with a phase shift of 90° between the signals for each second input of these two product detectors;

90° phase shift means connected with the output of each of the product detectors;

signal adding means, supplying the sum signal of the output signal from a product detector and the 90° shifted output signal of the other product detector, which sum signal corresponds with one side band of the signal demodulated by the product detectors;

signal subtracting means, supplying the difference signal of the output signal from a product detector and the 90° shifted output signal from the other product detector, which difference signal corresponds with the other side band of the signal demodulated by the product detectors.

12. Device as claimed in claim 11, and:

first delay means in each signal processing channel, the input of which receives gate pulses, the output supplying a first sample control signal having such a time delay, that the first sample control signal will appear immediately before the reception by the receiving transducer of the front edge of the pulse-shaped carrier wave signal;

second delay means in each channel, the input of which receives the gate signals, the output supplying a second sample control signal having such a second time delay, that the second sample control signal will appear immediately after the reception by the receiver transducer of the front edge of the pulse-shaped carrier wave signal;

four sample hold means in each signal processing channel, one pair of which receives the output signal of the first product detector and the other pair of which receives the output signal of the second product detector, one of the sample hold means of each pair also receiving the first sample control signal and the other of the sample hold means of each pair also receiving the second sample control signal;

subtracting means for each pair of sample hold means, supplying the difference between the output signals of the pairs of sample hold means, which difference contains nearly exclusively information concerning the modulation of the carrier wave signal in the fluid.

13. Device as claimed in claim 12, in which the sample control signals are of such short duration, that almost no change of the information contents of the signal supplied by the receiver transducer will occur within the duration of these signals.

14. Device as claimed in claim 12, in which the first sampling control signal and the second sampling control signal are generated so soon after each other, that within this time almost no change will occur of the background broad band noise signal.

15. Device as claimed in claim 13, and:

third delay means in each signal processing channel, the input of which receives gate signals, the output supplying a third sample control signal, having such a third time delay, that this third sample control signal appears after the front edge of the difference output signal supplied by the subtraction means;

two further sample hold means in each signal processing channel, one input of which receives the third sample control signal, the other input of each of the sample hold means being connected with one of the subtracting means, such that the sample hold means exclusively supply a signal corresponding with the pure difference signal of each of both subtraction means.

16. Device as claimed in claim 15, in which the output of each product detector is connected to a low pass filter having such a rise time, that this filter can readily follow the information contents of the product detector output signal and in which each third sample hold circuit is connected with a band filter, passing exclusively signals containing information concerning the modulation imparted to the carrier wave signal by the medium.

* * * * *